US006046558A

United States Patent [19]

Larson et al.

[11] Patent Number: 6,046,558

[45] Date of Patent: Apr. 4, 2000

[54] ELECTRONIC PADLOCK

[75] Inventors: Wayne F. Larson; Christopher R. Kickner, both of Salem, Oreg.

[73] Assignee: SLC Technologies, Inc., Salem, Oreg.

[21] Appl. No.: 09/124,558

[22] Filed: Jul. 29, 1998

Related U.S. Application Data

[63] Continuation-in-part of application No. 08/873,054, Jun. 11, 1997, which is a continuation-in-part of application No. 08/746,322, Nov. 11, 1996, and application No. 09/067,353, Apr. 27, 1998.

[60] Provisional application No. 60/009,920, Jan. 12, 1996.

[51] Int. Cl.$^{7}$ .......... H02P 1/00

[52] U.S. Cl. .......... 318/283; 318/280; 318/798; 318/80; 318/281; 318/732; 70/277; 70/283

[58] Field of Search .......... 318/280; 76/277; 70/283, 275, 280; 310/798, 80, 281, 432, 283

[56] References Cited

U.S. PATENT DOCUMENTS

| | | | |
|---|---|---|---|
| 2,460,615 | 2/1949 | Andrew . | |
| 3,812,403 | 5/1974 | Gartner . | |
| 3,828,340 | 8/1974 | Bauer, Jr. et al. . | |
| 3,889,501 | 6/1975 | Fort . | |
| 3,901,057 | 8/1975 | Coley, Sr. . | |
| 4,411,144 | 10/1983 | Aydin . | |
| 4,453,161 | 6/1984 | Lemelson . | |
| 4,534,194 | 8/1985 | Aydin . | |
| 4,556,872 | 12/1985 | Masoncup et al. . | |
| 4,593,543 | 6/1986 | Stefanek | 70/134 |
| 4,594,637 | 6/1986 | Falk . | |
| 4,677,284 | 6/1987 | Genest . | |
| 4,727,368 | 2/1988 | Larson et al. . | |
| 4,766,746 | 8/1988 | Henderson et al. . | |
| 4,851,652 | 7/1989 | Imran . | |
| 4,887,292 | 12/1989 | Barrett et al. . | |
| 4,896,246 | 1/1990 | Henderson et al. . | |
| 4,901,545 | 2/1990 | Bacon et al. . | |
| 4,914,732 | 4/1990 | Henderson et al. . | |
| 4,916,443 | 4/1990 | Barrett et al. . | |
| 4,929,880 | 5/1990 | Henderson et al. . | |
| 4,939,437 | 7/1990 | Farag et al. | 318/473 |
| 4,967,305 | 10/1990 | Murrer et al. . | |
| 4,988,987 | 1/1991 | Barrett et al. . | |
| 5,046,084 | 9/1991 | Barrett et al. . | |
| 5,090,222 | 2/1992 | Imran . | |
| 5,181,403 | 1/1993 | Lii . | |
| 5,198,643 | 3/1993 | Miron et al. . | |
| 5,206,637 | 4/1993 | Warren . | |
| 5,223,708 | 6/1993 | Van Deventer . | |
| 5,280,518 | 1/1994 | Danler et al. . | |
| 5,351,042 | 9/1994 | Aston . | |
| 5,437,174 | 8/1995 | Aydin . | |
| 5,460,020 | 10/1995 | Hungerford . | |
| 5,475,375 | 12/1995 | Barrett et al. . | |
| 5,477,213 | 12/1995 | Atarashi . | |

(List continued on next page.)

FOREIGN PATENT DOCUMENTS

| | | |
|---|---|---|
| 132951 | 12/1947 | Australia . |
| 553 509 A1 | 8/1993 | European Pat. Off. . |
| 2144483 | 3/1985 | United Kingdom . |
| WO 86/00108 | 1/1986 | WIPO . |
| WO 98/13080 | 11/1990 | WIPO . |
| WO 90/15910 | 12/1990 | WIPO . |

*Primary Examiner*—Karen Masih
*Attorney, Agent, or Firm*—Klarquist Sparkman Campbell Leigh & Whinston, LLP

[57] ABSTRACT

Latching components of a padlock are driven by a motor between latched and released positions. An encoder element with associated optical elements provides position information to a control circuit. The control circuit correlates the position information with the signal directing power to the motor so that the motor is precisely controlled for moving the latching elements between release and latch. If the motor jams (sensed by overcurrent), it is operated briefly in alternating directions to try and dislodge the grit or ice causing the jam. The padlock shackle is latched into place by balls which are driven into recesses in the shackle legs. The use of plural balls on at least one side helps isolate the drive motor and gears from grit that may enter through the padlock's top shackle holes.

11 Claims, 3 Drawing Sheets

U.S. PATENT DOCUMENTS

| | | | |
|---|---|---|---|
| 5,508,691 | 4/1996 | Castleman et al. . | |
| 5,511,832 | 4/1996 | Künzel . | |
| 5,550,529 | 8/1996 | Burge . | |
| 5,561,996 | 10/1996 | Chang . | |
| 5,605,066 | 2/1997 | Hurskainen . | |
| 5,634,677 | 6/1997 | Büscher . | |
| 5,680,783 | 10/1997 | Kuroda | 70/277 |
| 5,705,991 | 1/1998 | Kniffin et al. . | |
| 5,712,626 | 1/1998 | Andreou et al. | 70/278 |
| 5,714,854 | 2/1998 | Mizuta et al. | 318/293 |
| 5,715,715 | 2/1998 | Nunez | 70/283 |
| 5,758,522 | 6/1998 | York . | |
| 5,791,172 | 8/1998 | Deighton et al. . | |

ELECTRONIC PADLOCK

This application is a continuation-in-part of application Ser. No. 08/873,054, filed Jun. 11, 1997, which is a continuation-in-part of U.S. patent application Ser. No. 08/746,322, filed Nov. 11, 1996, which claims priority from U.S. provisional application No. 60/009,920, filed Jan. 12, 1996. This application is also a continuation-in-part of copending application 09/067,353, filed Apr. 27, 1998. The foregoing applications are incorporated herein by reference.

FIELD OF THE INVENTION

The present invention relates to electronic access control devices, and particularly to an electronically controlled padlock.

BACKGROUND AND SUMMARY OF THE INVENTION

There are numerous types of conventional mechanical padlocks that effectively provide security functions. Each padlock is opened with a key that may be carried separately by one authorized to open the padlock. The key may be common to a number of padlocks. For example, a key carried by a lineman of a power company may provide access to padlocks at a number of power distribution stations. This, however, raises the specter of the power stations becoming accessible to anonymous ne'er-do-wells if this key is lost or duplicated.

The notion of electronic control of padlocks contemplates eliminating such difficulties associated with mechanical padlocks. Despite the prevalence of padlocks, however, and the long-known availability of electronic security systems, no one has heretofore successfully applied electronic security technology to this application, especially for padlocks adapted for extended periods of non-use in outdoor environments.

The security problems with prior art padlocks generally concern their latch mechanisms. Latch mechanisms employing electromagnets are susceptible to magnetic fields, which can be induced by holding magnets close to the lock. A magnetic field of sufficient magnitude can cause the padlock to release. As a result, extra measures such as added shielding must be added to the lock, at added expense.

Padlocks employing solenoid-activated release mechanisms are susceptible to release by applying an impact, such as a hammer blow, to the lock. Solenoid-activated release mechanisms are also susceptible to externally induced magnetic fields.

If left unused for several years in an outdoor environment, electronic padlocks tend to stick, making them unreliable. This is generally due to lack of motive power (whether from a motor, a solenoid, an electromagnet, etc.) sufficient to activate a release mechanism made sluggish by aging of lubricants, ice, foreign matter, etc.

In accordance with a preferred embodiment of the present invention, the foregoing and additional drawbacks of the prior art are overcome. The present invention provides an electronic padlock having a latch assembly operable for releasing and latching the shackle of the padlock. The latch assembly is controlled by a motor or gearmotor that is housed within the lock. The body of the padlock includes contacts so that the power for driving the motor (hence, for releasing the shackle) is applied from an external source, thereby avoiding the unreliability associated with locks that must be left unused for several years in an outdoor environment.

As another aspect of the present invention, the motor is precisely controlled for reliably moving the latch assembly into and out of position for releasing and latching the shackle. To this end, an encoder assembly is provided within the padlock. This assembly includes an encoder element that moves with the motor driven components of the latch assembly. A light emitter/detector pair is mounted inside the padlock body near the encoder element. The output of the light detector varies, depending upon whether the latch assembly, and connected encoder element is in the position for latching the shackle. This output, therefore, is encoder position information that is indicative of whether the shackle is released or latched.

The encoder position information is provided to the a control circuit carried in the padlock. This circuit is also connected to control application of the external power source to the motor. A processor of the circuit correlates the encoder position information with the power control to the motor precisely to move the latch assembly into the latched or released position.

An electronic key provides, in addition to the motor-power supply, information about the identity and authorization level of the key holder. A keypad carried on the key permits an authorized user to signal (request) release of the padlock. The lock control system, as well as that of the key, carries a memory for logging, for example, each lock access by time, key holder duration of lock opening, etc.

As one aspect of the invention, the key also records in memory the last state (open or closed) of a particular padlock. Such information is useful, once extracted from the memory, for checking whether a lock may inadvertently have been left open, without requiring one to return to a remote padlock for a visual check.

The foregoing and additional features and advantages of the present invention will be more readily apparent from the following detailed description, which proceeds with reference to the accompanying drawings.

DETAILED DESCRIPTION OF A PREFERRED EMBODIMENT

Figure 1:
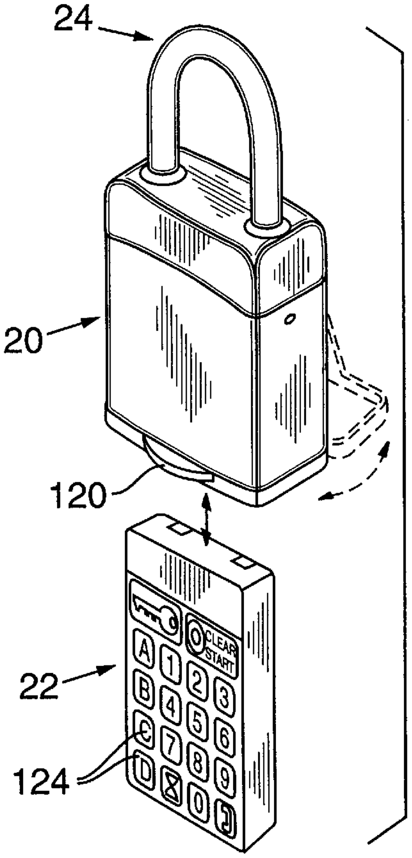
FIG. 1 shows the primary components, padlock and key, of an electronic padlock in accordance with a preferred embodiment of the invention.

Referring to FIG. 1, an electronic padlock in accord with the present invention can be considered as an assembly or system comprising the padlock 20 and associated electronic key 22. The padlock 20 includes a shackle 24 that, in a manner similar to prior art padlocks, is moveable once released so that only one end of the shackle remains inside the padlock. As will become clear, control and motive power for releasing the shackle is provided by the key 22 in conjunction with control of the electronics inside of the padlock 20.

Figure 2:
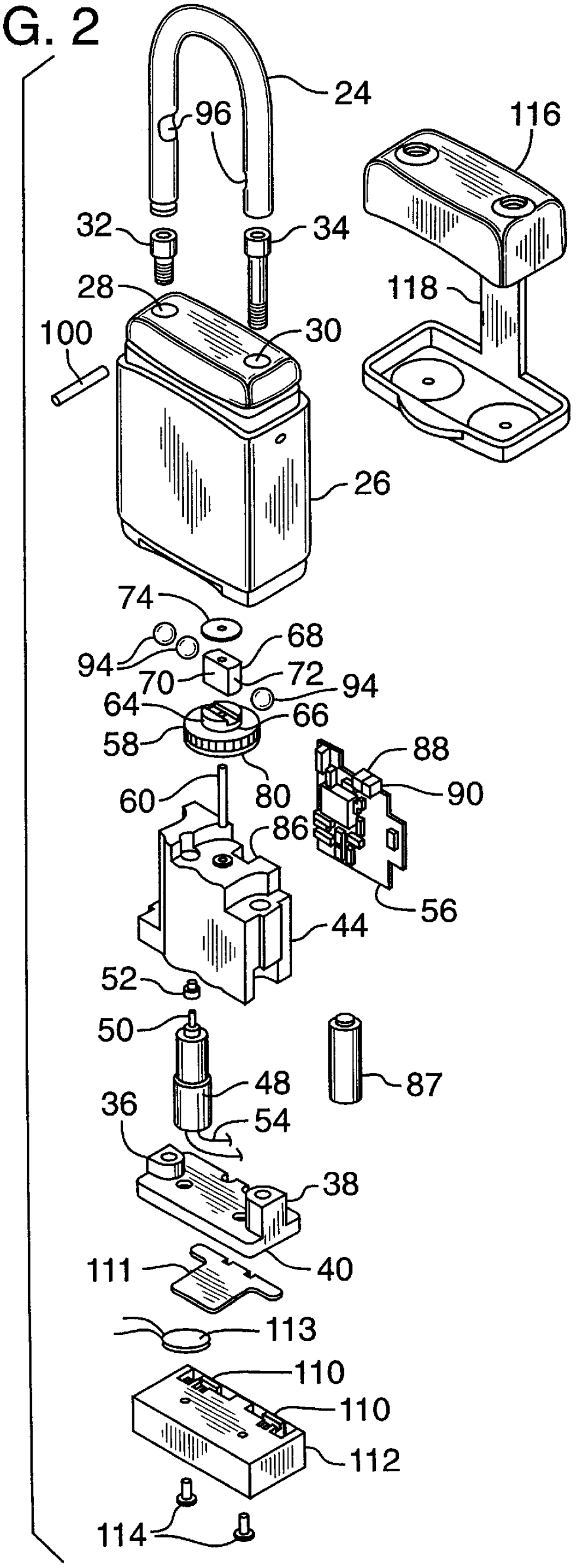
FIG. 2 is an exploded view of the padlock of FIG. 1.
Figure 4:
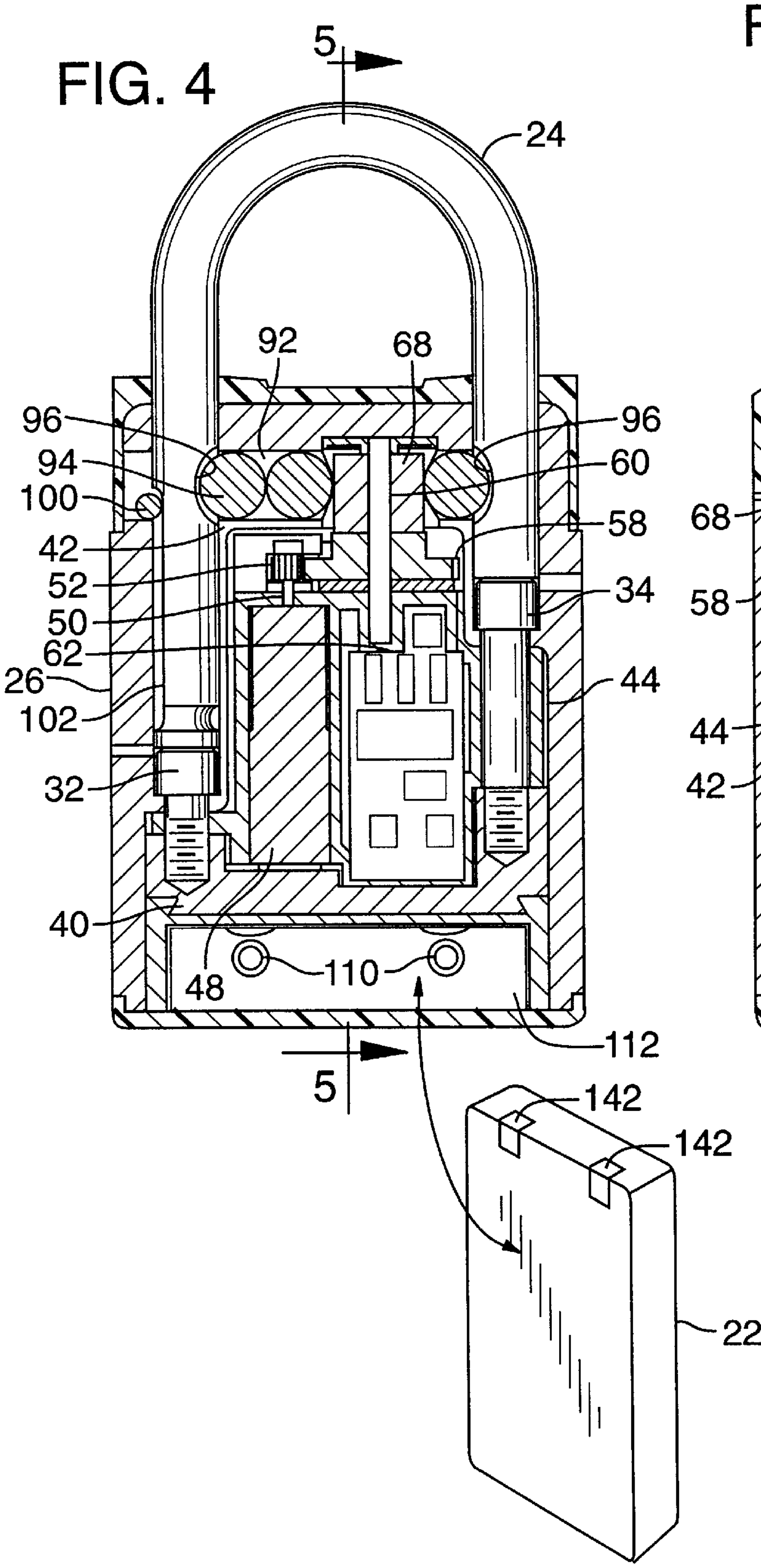
FIG. 4 is a cross-sectional view of the padlock.
Figure 5:
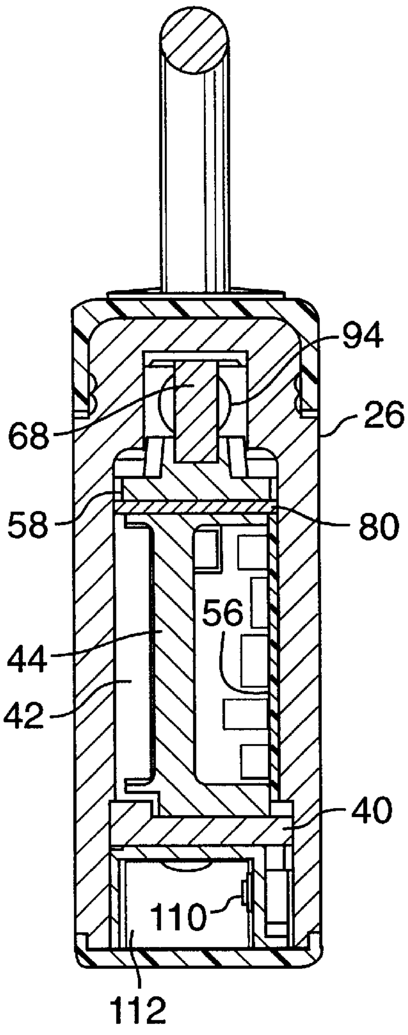
FIG. 5 is a cross section, taken along line 5—5 of line 4.

Referring to FIGS. 2, 4, and 5, the padlock 20 includes a rigid metal body 26. The body is generally hollow and includes a pair of apertures 28, 30 extending through its upper end. Into each aperture fits a bolt 32, 34. The heads of the bolts 32, 34 abut against shoulders in the base of each aperture 28, 30 so that the bolts are unable to pass completely through the padlock body 26. The threaded end of each bolt engages an internally threaded sleeve 36, 38 that protrudes upwardly and is integrally formed with a rigid base plate 40. When fastened by the bolts 32, 34, the base plate 40 defines with the interior of the base 26 an internal compartment 42 (FIGS. 4 and 5) that house and protect from adverse elements most of the remaining components of the lock.

Inside of the compartment 42, there is fastened a chassis 44 through which the bolts 32, 34 pass and secure against the base plate 40. A small electrically powered motor 48, such as model 138254 or M97660A, both by Maxon of Switzerland, fits within a correspondingly shaped space within the chassis 44. The leads 54 (FIG. 2) of the gearmotor are connected to a small circuit board 56 that provides the electronic control for the motor as described more fully below.

The gearmotor 48 includes a rotatable drive shaft 50 that protrudes upwardly through the top of the chassis 44. A pinion gear 52 is fastened to the part of the shaft 50 that protrudes above the chassis. The pinion gear 52 engages a main gear 58 that is rotatably mounted to the upper surface of the chassis 44 alongside the pinion gear 52. In this regard, a pin 60 has its lower end seated within a pocket 62 (FIG. 4) formed in the upper surface of the chassis 44. The pin extends through a central aperture in the main gear 58 and provides the axis about which the main gear rotates.

Atop the main gear is fastened a slotted disk 64 through which the pin 60 also protrudes. The disk 64 includes an upwardly facing slot 66 into which fits the bottom of a bar 68. As viewed from above the bar 68 is generally oblong shaped having flat long sides 70 and convex curved short sides 72. The pin 60 protrudes through a central opening in the bar 68 and has its uppermost end terminating within the central opening of a washer 74.

Figure 7:
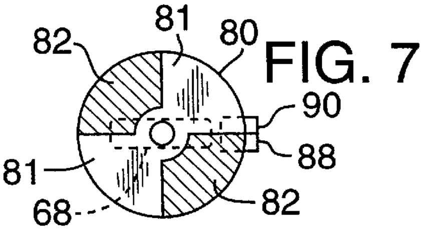
FIG. 7 is a diagram of an encoder element as positioned relative to light emitters and detectors while the padlock is in one, opened or closed, state.
Figure 8:
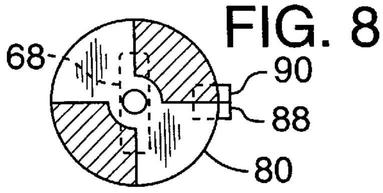
FIG. 8 is a diagram of an encoder element as positioned relative to light emitters and detectors while the padlock is in another state.

With particular reference to FIGS. 2, 7 and 8, an encoder element 80 is mounted to the underside of the main gear 58. In a preferred embodiment, the encoder element is a thin circular sheet. The encoder element 80 is preferably constructed of a polyester film, such as that sold under the Mylar trademark by DuPont. The encoder element 80 is colored to include two portions, one of which reflects light at a rate much higher than does the other.

More particularly, the encoder element 80 is colored such that, from a light-reflectivity standpoint, the surface of that element is divided into four sectors that include two diametrically opposed, highly reflective sectors 81, and two other diametrically opposed less reflective sectors 82. From a geometric standpoint, the underside of the main gear is divided into four, ninety-degree quadrants. Each quadrant reflects more or less light than the quadrant immediately adjacent to it. Away from the center part of the encoder element underside, the borders between the light and dark quadrants are defined by the straight, radially projecting lines.

A notch 86 is formed in the top of the chassis in a region underlying the periphery of the main gear 58. Seated within the notch are two optical elements 88, 90 that are mounted to the board 56 mentioned above.

As best shown in FIG. 5, the board is mounted to the backside of the chassis 44, which is otherwise open to receive the electronic components that protrude from the board 56, as described more fully below. The optical elements 88, 90 each comprise a light emitting diode and adjacent photo detector. Thus, underlying the main gear 58 and its attached encoder element 80 are these two pair of optical elements. FIGS. 7 and 8 show bottom views of the encoder element. Added in dashed lines 88, 90 in FIGS. 7 and 8 are the optical elements for the purpose of depicting their relative orientation with respect to the encoder element 80 when the shackle is latched (FIG. 7) and released (FIG. 8), respectively, as described more fully below.

With reference to FIGS. 2 and 4, the bar 68 protrudes into a cavity 92 formed in the uppermost part of the padlock body 26. Three steel balls 94 are contained within the cavity. When the lock is in the latched state, as shown in FIG. 4, the outermost two of the balls fit within recesses 96 formed in the shackle 24. With the balls 94 so engaging the recesses 96 the shackle cannot be pulled upwardly for releasing one of the ends of the shackle from the padlock body. Inward movement of the balls 94 away from the shackle is prevented by the bar, which is sized so that its short ends 72 bear against two of the balls to secure the balls in the latched position as shown in FIG. 4.

When the motor 48 is driven, main gear 58 turns ninety degrees. (Intermediate pinion gear 52 turns about one and a half turns.) The ninety-degree rotation of main gear 58 swings the bar 68 so that its long sides 70 face the balls. This orientation of the bar places the latch assembly (which assembly may be considered the bar balls, and shackle combination) into a release position such that upward pulling on the shackle 24 will permit the curved surfaces of the shackle recesses 96 to direct the balls inwardly with sufficient clearance to permit one end (the right-side end in FIG. 4) to be completely removed from the shackle body 26. The other end of the shackle will be retained in the lock body by a pin solid 100 that passes through the lock body 26 and fits in an elongated recess 102 formed in the other end of the shackle. (Although not particularly shown, pin 100 is scored at one end to form a series of grooves, each surrounded by a pair of ridges that serve to slightly increase the end diameter of the pin.)

The illustrated arrangement is advantageous in several respects. For example, the use of two balls on at least one side better isolates the gears 52/58 and the motor 48 from grit that may be introduced into the lock internals through the shackle holes 28, 30. The illustrated balls fit closely in their bores, making it difficult for a piece of grit to get past a ball. The use of multiple balls on a single side makes it even more difficult. The use of multiple balls also permits smaller balls to be used than would otherwise be the case, resulting in a smaller lock housing and a lighter lock. The smaller balls also contribute to security. A larger ball would entail a relatively shallower scoop out of the shackle—a scoop from which the ball could more readily be forced. A smaller ball, in contrast, nests in a relatively steeper scoop in the shackle, and is commensurately more difficult to dislodge. Finally, the asymmetrical ball placement permits the drive motor to be offset, giving more latitude as to its placement.

Figure 3:
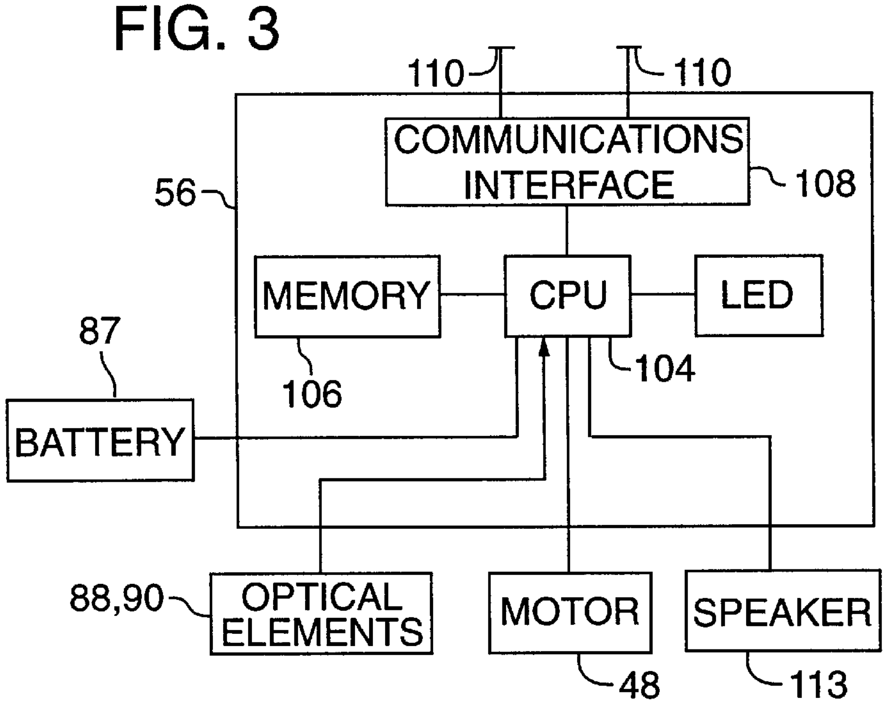
FIG. 3 shows a block diagram of the electronics internal to the padlock of the present invention.

Referring to FIG. 3, circuitry carried on the padlock printed circuit board 56 includes a CPU 104, a memory 106, and a communications interface 108. The illustrated communications interface 108 employs two electrical contacts 110, that are exposed in a recess or box 112 in the underside of the padlock body 26. Preferably, a thin, insulating sheet 111 is located between the base 40 and box 112.

A small piezoelectric speaker 113 is secured between the insulating sheet 111 and the box 112. The speaker is driven by the CPU 104 to audible signals to indicate the lock state—three beeps on opening, and five beeps on closing. (Different signals are used to allow the user to determine the internal state of the lock if it is not evident externally—e.g. if frozen water is preventing any shackle movement.) The audible signal apprises the user that the lock has performed as requested (latched or released) and the key may, therefore, be removed. The CPU determines the latch assembly position as a result of information provided by the optical elements 88, 90.

The contacts 110 are connected by wires (not shown) to the circuit board 56. The contacts 110 are connected to a five-sided interface box 112 that is mounted, as by rivets 114, to the underside of the base plate 40 so that the interface box 112 opens downwardly. The contacts 110 protrude through one long side of the interior of the box 112 to engage similar contacts on the electronic key 22 as described more fully below.

In a preferred embodiment, a protective plastic cover 116 generally comprises upper and lower cap that joined by a web 118. The cover 116 is fit over the body 26 of the padlock to cover the upper end of the padlock and to close the interface box 112, thereby to protect from environmental elements the protruding contacts 110. As illustrated in FIG. 1, the cover 116 includes a protruding lip 120 that can be pushed away from the lock so that the bottom cap of the cover can be moved away to expose the nest 112 for receipt of the end of the key.

Figure 6:
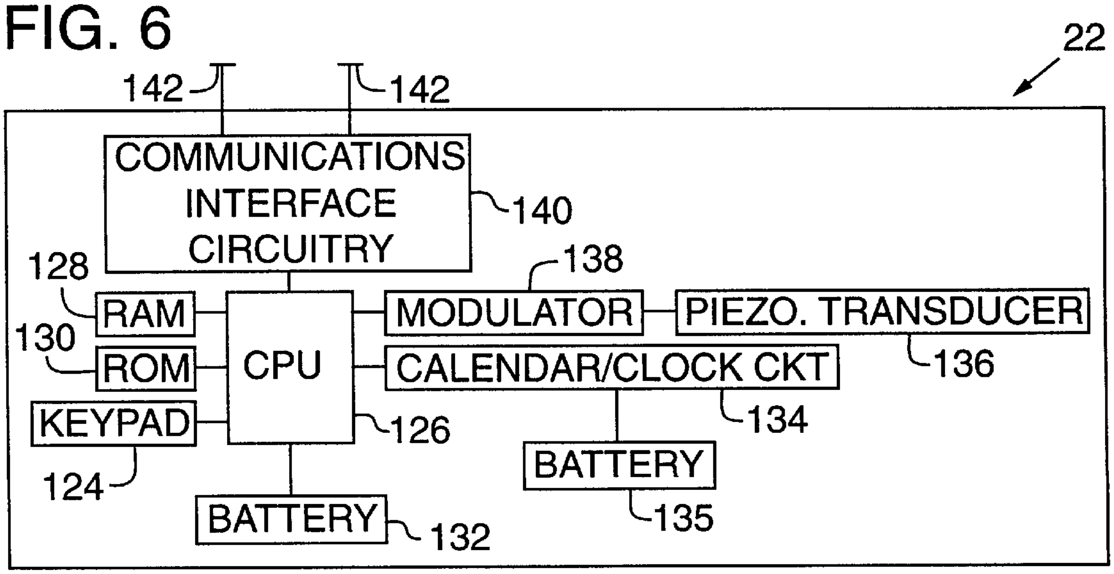
FIG. 6 shows a block diagram of an electronic key used with the padlock.

As shown in FIGS. 1, 4, and 6, illustrated key 22 includes a keypad 124 and houses a CPU 126, RAM and ROM memories 128, 130, a primary battery 132, a calendar/clock circuit 134, a piezoelectric transducer 136 with associated modulator 138, and a communications interface 140. The illustrated communications interface employs two electrical contacts 142, exposed on top of the key, but other coupling arrangements (e.g. more than two contacts, inductive coupling, radio coupling, optoelectronic coupling, infrared coupling, etc.) can alternatively be used. In other embodiments, key 22 can include a small alphanumeric display (e.g., LCD) and/or one or more indicator lights (e.g., LEDs).

Contacts 142 connect to the corresponding contacts 110 of the nest 112 when the key is inserted therein. Illustrated communications interface 140 bidirectionally couples data signals between the key 22 and padlock 20 in the form of modulation on a power signal provided from the electronic key 22 to the padlock 20. Key 22 can serve not only as an access key for the padlock 20, but also serves as a data link—relaying data to and from the padlock 20. One way of effecting this transfer of data and power over just two contacts is shown in U.S. Pat. No. 5,475,375.

CPU 126 can be an Intel microcomputer (e.g. 80C52) which controls operation of the key according to programming instructions permanently stored in ROM 130. (Alternatively, CPU 126 can be a model PIC 16C73A, available from Microchip. This CPU includes 4K of onboard program memory, and 192 bytes of data memory.) The calendar/clock circuit 134 provides data corresponding to the year, month, day, and time (and can be implemented by CPU 126 and memory 130).

The illustrated RAM 128 is comprised of a small RAM memory inside the calendar/clock circuit 134, together with 2 EEPROMS, the latter of which can store 2048 (2K) 8-bit bytes of data.

Transducer 136 is used to provide audible feedback to the user signaling a variety of key conditions. The transducer is also used for frequency shift keyed relaying of data from the key to external devices (e.g. through an audio telephone circuit).

Battery 132 comprises three AAA cells which provide power to the key circuitry and, through contacting elements 142, to padlock 20 as well. An auxiliary battery 135 or storage capacitor (not shown) can be employed to provide power to the calendar/clock circuit 134 when battery 132 is removed and replaced.

Desirably, key 22 is constructed in a trim polycarbonate case sized to fit conveniently in a user's pocket. Additional information on key 22 can be found in U.S. Pat. No. 5,280,518.

In operation, a key 22 case fits into the nest 112, with contacts 142 and 110 engaged. Preferably, an electronic handshaking sequence then ensues, followed by a request from the key to access the lock.

If the padlock CPU 104 determines that the key properly authorized release of the padlock 20, CPU 104 provides properly conditioned driving signals to the motor 48 which in turn moves the latch assembly out of the latch position. More particularly, as the motor is driven, the fastened pinion gear 52 rotates the engaged main gear 58 so that the bar 68 carried on top of the main gear also rotates about the pin 60. Once the bar 68 is rotated ninety degrees (from the orientation shown in FIG. 4), the balls 94 of the latch assembly are free to move inwardly such that the shackle is released as described above.

It is noteworthy that the power for driving the gearmotor is normally provided by the battery contained within the key, which power is directed by the CPU through the communications interface 140. In a preferred embodiment, a lithium battery 87 (FIG. 2) is carried in the chassis 44 to provide power to the gearmotor in limited circumstances. Specifically, the battery 87 energy is used only in instances where the key 22 (along with its battery) is removed from engagement with the padlock 20 while the latch assembly is in neither the released or latched position. In such an instance, the CPU will, upon detection or premature removal of a key, direct power from the battery to the motor for only as long as necessary to complete movement of the latch assembly into the starting state. (I.e., if the key is withdrawn during an opening operation, the lock is returned to its lock state. If the key is withdrawn during a locking operation, the lock is returned to its open state.)

The voltage on the internal battery is sensed by conventional circuitry to determine the relative condition of the battery. If the battery is depleted, it will be used only to complete open operations; not close operations. (In one such embodiment, the lock will not close with the internal battery depleted, even if the key is kept coupled to the lock.)

In accord with the present invention, the position of the main gear 58 (hence the bar 68 that it carries) is precisely monitored by the use of the optical elements 88, 90 and encoder 80 is described above. In this regard, the relative positions of those optical elements 88, 90 and encoder 80 are arranged such that (as best shown in FIG. 7) when the bar 68 is in the latched position, one of the optical element pairs (that is, a light emitter and light detector) will underlie the relatively highly reflective sector 81 or the encoder element

80. The immediately adjacent optical elements 88 will underlie the relatively nonreflective sector 82 of the encoder element. The output signals of these elements 88, 90 are provided to the CPU which will receive and compare those signals. Thus, a comparison showing a relatively high output signal for one optical element 90 and a relatively low output signal for the other optical element 88 will indicate that the encoder is positioned such that the latching components are in the latched position.

On the other hand, when the bar 68 is rotated to place the latching components in a released positioned (FIG. 8) the output signals of the optical elements 88, 90 will be reversed. Element 88 returning a relatively high output compared to element 90.

The encoder position information provided to the CPU from the optical elements 88, 90 is correlated to the drive signal applied to the motor 48 so that in the course of opening the lock (that is, rotating the motor) the CPU will immediately halt the drive signals to the motor when the encoder position information reaching the CPU reaches the output combination mentioned with respect to FIG. 8.

It will be appreciated that the encoder position information may be stored in the memory 106 of the padlock and/or the memory 128 of the key. Such information is useful, for example, once extracted from the key memory for determining whether a remote lock may have inadvertently been left in an open state. This determination can, therefore, be made without the need to return to the remote padlock for a visual check.

Other information concerning access to the padlock can be stored in the memory of the key or padlock. This information can be used to identify users who withdraw their key prematurely from the lock, forcing dissipation of the lock's internal battery to complete locking and unlocking operations.

A further feature of the illustrated embodiment is its use of a "shake mode." "Shake mode" is employed to dislodge grit, ice, or the like, which jams the lock from opening. A jam is detected by a simple current sensing circuit, which monitors the current drawn by the electric motor. The current drain is nominally 10–15 milliamperes. A jam is declared if the motor current drain exceeds 100 milliamperes.

If a jam is detected, the normal drive signal is removed from the motor. Instead, a reverse drive signal is briefly applied (255 milliseconds), causing the motor and gears to retro-turn. The normal drive signal is then re-applied (immediately in the illustrated embodiment). If the jam persists (i.e. if an overcurrent is again sensed), the process repeats. The forward and retro cycles are short enough that the lock shakes slightly, contributing to the intended effect of dislodging some piece of grit or ice that is jamming the intended operation. The illustrated embodiment repeats this forward/retro cycle six times. If the overcurrent condition still persists after six tries, the operation is aborted and the lock returns to the fully opposite state (opened or closed). As with the other lock operations, these are effected by corresponding CPU instructions stored in the lock memory.

The detailed padlock is a component of a secure access system marketed by the assignee under the TRACcess brand name. Additional details on elements of the system, such as operational features, nest design, key design, etc., can be found in related U.S. Pat. Nos. 5,758,522, 5,550,529, 5,705,991, 5,475,375, 5,280,518, 5,046,04, 4,800,255, 4,851,652, 4,864,115, and 4,967,305, and in copending applications Ser. No. 08/846,040, 08/746,322, and 09/067,353, the disclosures of which are incorporated by reference.

Having described the principles of our invention with reference to a preferred embodiment, it should be apparent that the invention can be modified in arrangement and detail without departing from such principles.

For example, while the invention has been illustrated with reference to an embodiment employing two balls on one side of bar 68, and one on the other side, in other embodiments different numbers of balls can be used. Similarly, while the illustrated embodiment shows a single ball on the short shackle leg-side of bar 68, a single ball can alternatively be employed on the long shackle leg-side of bar 68.

Moreover, the actuator that drives the balls into the shackle cutouts needn't be an electric motor. Other drive arrangements—either electric (e.g. solenoid or shape memory alloy) or mechanical can alternatively be used. (The use of shape memory alloys in locks is disclosed in provisional application Ser. No. 60/085,851, entitled Electrically Controlled Lock Employing Shape Memory Alloy, filed May 18, 1998, and incorporated herein by reference.)

While an illustrative system has been detailed for determining the position of the lock internals, in other embodiments, other arrangements can naturally be employed. For example, the motor can be run until it runs out of gear teeth. The end of teeth can be sensed optically, by motor current drain, by mechanical sensor, or otherwise. Or the motor can be run until an actuator trips a Microswitch limit switch. In the illustrated optical encoder arrangement, a single light emitter can be employed with two adjacent detectors, if desired.

Still further, while the detailed embodiment normally derives all of its operating power from a power source in the key, in alternative arrangements the lock's internal battery 87 can provide all of its power needs. In one such embodiment, the internal battery is a rechargeable variety and is briefly recharged by the key battery each time a key is mated with the lock. In another, the internal battery is recharged by an auxiliary battery charger that is coupled to the lock.

Yet further, a key is not necessary. Most of the foregoing principles are equally applicable to keyless security systems, such as those employing a code pad on the lock (or, more far off, a speech recognition unit, a biometric sensor, etc.). Alternatively, the lock can be provided with a magnetic strip card reader, to be used in conjunction with a mag stripe user key. Still further, the lock can be responsive to a Dallas Semiconductor button key, of the type described in U.S. Pat. No. 5,587,955 and laid-open PCT application Ser. No. 97/04414, the disclosures of which are incorporated by reference.

Although the preferred embodiments have been described as including certain combinations of features, applicants' invention includes alternative embodiments that include other combinations of the features disclosed herein and in the documents incorporated by reference.

Accordingly, it should be recognized that the foregoing embodiments are illustrative only and should not be taken as limiting the scope of our invention. Instead, we claim as our invention all such modifications as may come within the scope and spirit of the following claims and equivalents thereto.

We claim:

1. A method of operating a motor actuated electric lock comprising:

(a) operating the motor in a first direction;

(b) monitoring energy consumed by the motor;

(c) if the energy is abnormal, operating the motor in a second direction opposite the first; and (d) repeating at least step (a).

2. The method of claim 1 in which step (b) includes monitoring current drawn by the motor.

3. The method of claim 1 which includes alternately attempting to operate the motor in the first direction, and then in the second direction, N times, where N is at least two, and discontinuing said attempts after N times if abnormal energy consumption persists.

4. The method of claim 3 in which N is at least five.

5. The method of claim 3 in which the lock is in a first state before the method commences, and returning the lock to the first state if said attempts are discontinued.

6. The method of claim 1 in which the motor is operated in the second direction for about 255 milliseconds.

7. A method of freeing a jam in a motor-operated lock, comprising:

detecting the jam in the lock based on energy consumed by the motor; and freeing the jam by reversing a direction in which the motor is operating at least twice.

8. The method of claim 7 in which the detecting includes monitoring current drawn by the motor.

9. The method of claim 7 in which the detecting includes detecting if a current drawn by the motor is at least six times greater than a normal operating current.

10. A method of freeing a jam in a motor-operated lock, comprising:

detecting the jam in the lock; and shaking the lock by alternatingly operating the motor in opposite directions.

11. The method of claim 10 in which the lock is in a first state before the method commences, further comprising returning the lock to the first state if the jam is not shaken free after a predetermined number of attempts.

* * * * *